United States Patent

Shneider et al.

[15] 3,701,524

[45] Oct. 31, 1972

[54] MODULARIZED CARD READER

[72] Inventors: Harold M. Shneider, Weston; Robert G. Bower, Concord, both of Mass.

[73] Assignee: Honeywell Inc., Minneapolis, Minn.

[22] Filed: Sept. 29, 1970

[21] Appl. No.: 76,412

[52] U.S. Cl. ........................271/10, 271/44, 271/54, 271/DIG. 4

[51] Int. Cl. ...............................................B65h 3/24

[58] Field of Search.........271/44, DIG. 4, 10, 54, 42, 271/41

[56] References Cited

UNITED STATES PATENTS

| | | | |
|---|---|---|---|
| 2,880,994 | 4/1959 | Last | 271/10 |
| 3,145,023 | 8/1964 | Cerf et al. | 271/44 |
| 3,232,604 | 2/1966 | Recca | 271/41 X |
| 2,358,131 | 9/1944 | Nobles | 271/41 |
| 3,271,926 | 9/1966 | England | 271/41 X |
| 3,341,193 | 9/1967 | Masterson | 271/44 UX |

*Primary Examiner*—Evon C. Blunk
*Assistant Examiner*—Bruce H. Stoner, Jr.
*Attorney*—Ronald T. Reiling and Fred Jacob

[57] ABSTRACT

A card reader having a combination of electromechanical modules, each of which operate independently of one another and yet when spatially positioned with respect to one another perform the machine functions of card transport and card reading. A pick-push module, comprising a picker knife and a pusher arm, cooperates with a card carrying module which includes rolls for moving cards through a visible wait station to a read station. A read head within the read station reads the cards.

2 Claims, 2 Drawing Figures

INVENTORS
Harold M. Shneider
Robert G. Bower
By [signature]
ATTORNEY

INVENTORS
Harold M. Shneider
Robert G. Bower
By [signature]
ATTORNEY

MODULARIZED CARD READER

BACKGROUND OF THE INVENTION

This invention relates to a card reader for computers or the like, and more particularly to a card reader which comprises a combination of electro-mechanical modules which perform the machine functions of card transport and reading.

Increasing attention has been given to the design of computer peripheral equipment in the past in order to improve its reliability. Reliability of peripheral devices may generally be improved by reducing the number of wearing and moving parts. Despite such achievements, however, the need for servicing such equipment both in the case of routine maintenance, or component failure, has not been eliminated. The ease of serviceability and maintainability, therefore, is a significant factor in the performance of computer peripheral devices.

It is thus an object of the present invention to provide a card reader which has a minimum number of wearing and moving parts.

It is a further object of the present invention to provide a card reader which has a high reliability of operation.

It is yet another object of the present invention to provide a card reader comprising a combination of electro-mechanical elements which lend themselves to ease of serviceability and maintainability.

Other objects of the invention will be evident from the description hereinafter presented.

SUMMARY OF THE INVENTION

The invention provides a card reader which has a card transport system comprising a card transport module and a cooperating pick-push module. The card carrying module has a transport plate containing a substantially rectangular wait station in which computer cards are singly located for visual identification and checking. Two arrangements of drive rolls are attached to the plate, each arrangement located respectively at two adjacent edges of the waiting area. The axes of the rolls are substantially parallel to their respective edges of the waiting area and their contact loci lie substantially within the same plane as the plate. At the opposite edge of the waiting area from one arrangement of drive rolls is an aperture through the plate. Located behind the other arrangement of drive rolls, on the side opposite the waiting area, is a second aperture through the plate.

The pick-push module consists of a picker and a pusher which are eccentrically coupled to a DC servo motor by respective rods. The picker and pusher have flexure bases which are independently mounted to a base plate, upon which the DC motor is attached, in order to provide pick-push motion along respective radii to the point of rod coupling. The picker and pusher are positioned with respect to their point of coupling and each other so as to allow a mating of the picker with the second aperture and the pusher with the first aperture in the transport plate.

The pick-push module is linked to the card carrying module by means of stand off posts of equal length which allow the picker and pusher to extend through their respective apertures and position their striking surfaces adjacent the top surface of the transport plate. The bases of the pusher and picker are of sufficient size in relation to the size of the respective apertures so as to allow linear motion toward their point of eccentric coupling.

An input hopper, which is capable of containing a group of cards to be read, is attached to the transport plate so that the bottom card therein rests adjacent the striking edge of the picker. When the picker is activated the bottom card is impelled against the contact edge of the rolls, forward of the knife, and carried by the rolls through to the wait station. The pusher is then activated through the coupling with the picker to strike the card in the wait station against the contact edges of the other drive rolls and the card is carried by the rolls through to the read station where the card is read by a read head.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
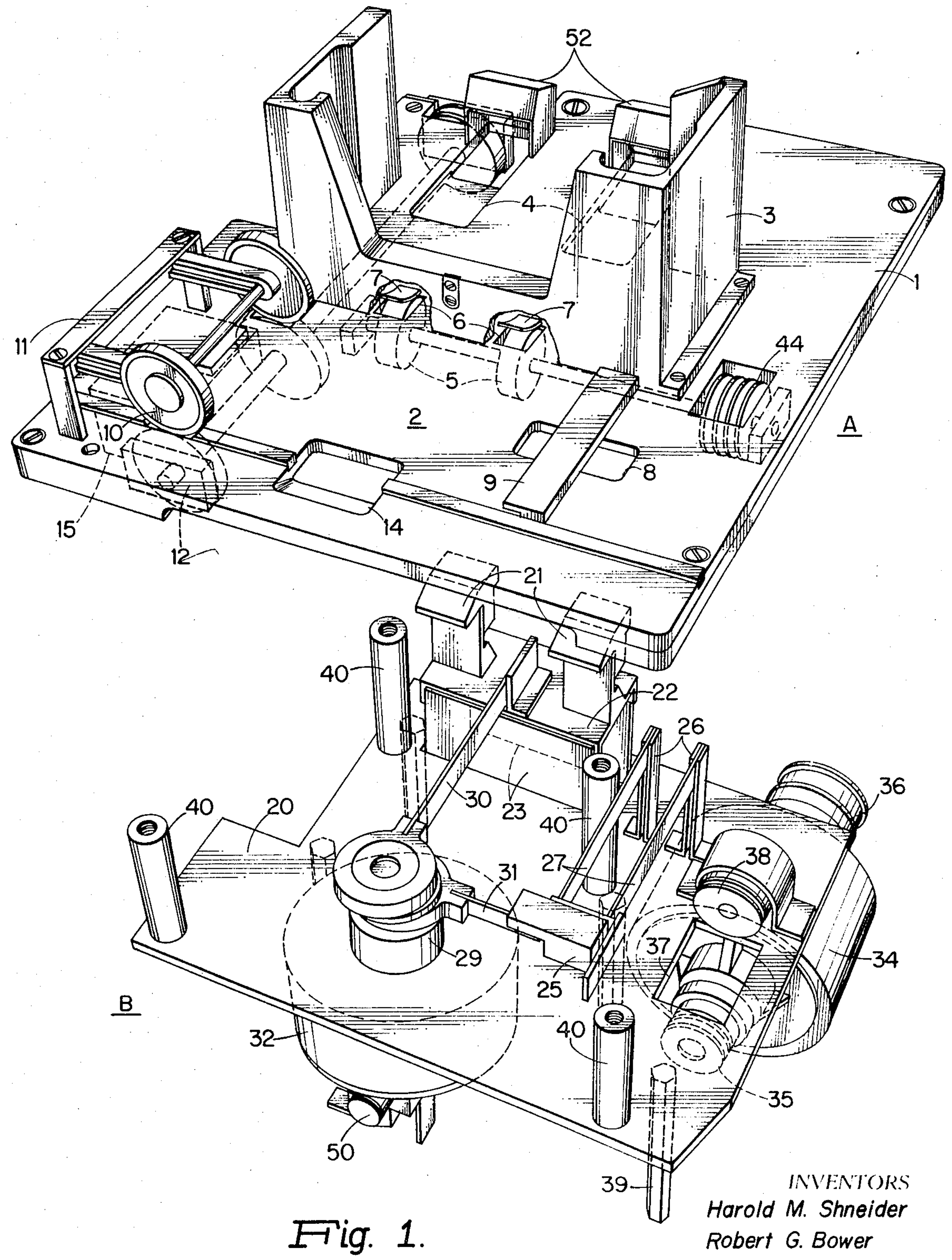
FIG. 1 is an exploded perspective view of the card carrying module and the pick-push module which cooperate to constitute the present invention.

The card transport system, as shown in FIG. 1, comprises a card carrying module A and a pick-push module B. The card carrying module A has a base plate 1 upon which is located a card wait station 2. The wait station 2 is substantially rectangular in shape. On one edge of the wait station 2, an input hopper 3 is attached to the base plate 1. The input hopper 3 is of sufficient size for containing a vertical stack of computer cards. On the side of the hopper 3 opposite from the wait station 2 are located apertures 4 in the base plate 1. At the side of the hopper 3 adjacent the wait station 2 is located a set of drive rolls 5. Drive rolls 5 are attached to the underside of the base plate 1 and extended through apertures 6 to the upper surface of the base plate 1. Positioned above the rolls is a leaf spring 7 which is attached to the input hopper 3. Leaf spring 7 is of such resiliency and curvature to direct a card which comes in contact with it against drive rolls 5.

At another adjacent edge of the wait station 2 is located aperture 8 in the base plate 1. Above aperture 8, a bar 9 is attached to the base plate 1. At the opposite side of wait station 2 from bar 9, is a pair of pinch rolls 10. Rolls 10 are attached to base plate 1 by frames 11 and 12 in order to fix their contact loci in the same plane as the upper surface of the base plate 1. At another edge of the wait station 2 opposite from the hopper 3, is aperture 14. Read head 15 is attached to plate 1, adjacent pinch rolls 10.

The pick-push module B of FIG. 1 has a base plate 20. Attached to base plate 20, are a set of picker knives 21. Picker knives 21 are attached to a horizontal plate 22 which is connected to base plate 20 by means of flexures 23. Pusher arm 25 is flexure mounted to the base plate 20 by means of vertical posts 26 and horizontal flexures 27. Picker knives 21 and the pusher arm 25 are located on base plate 20 so as to mate respectively with apertures 4 and 8 of base plate 1.

Picker knives 21 are of the type described in the Masterson patent, U.S. Pat. No. 3,341,193, which are employed for selecting the bottom card from the vertical stack of computer cards in the hopper 3.

Picker knives 21 and pusher arm 25 are connected respectively to an eccentric coupling 29 by flexure rods 30 and 31. DC servo motor 32 is connected to the underside and extends through the base plate 20 in order to connect with the eccentric coupling 29.

The eccentric coupling 29 provides reciprocating motion to the picker knives 21 and the pusher arm 25 through respective flexure drive rods 30 and 31. Drive rod 30 insure linear motion of the picker knives 21 towards the coupling 29 by its connection to the horizontal plate 22 at a point equidistant from the picker knives 21. Drive rod 31 also provides linear motion for the pusher arm 25 toward coupling 29. The eccentric coupling 29 is that described in co-pending application of Bower et al., Ser. No. 76,413 filed Sept. 29, 1970 and assigned to the assignee of the present invention. While such coupling 29 assures a sequential pick-push motion toward the coupling 29, any other coupling arrangement which provides the desired reciprocating motion of the knives 21 and the arm 25 may also be employed.

Also as shown in FIG. 1, a drive motor 34, which may be either AC or DC, is attached to the bottom surface of the plate 20. The drive motor 34 has drive pulleys 35 and 36 located respectively at each end of the motor drive shaft, which allows the motor 34 to drive from each end of the shaft. Drive motor 34 is employed for propelling drive rolls 5 and pinch rolls 10. Aperture 37 is in base plate 20, located above pulley 35. Attached to base plate 20 and positioned above aperture 37 is idler 38.

The pick-push module B is given foundational support by four base posts 39, which are connected to the bottom surface of base plate 20. Four stand-off posts 40 are attached to base plate 20 and extend vertically to connect with base plate 1 of module A. Stand-off post 40 serve as supporting structure for module A and also serve to position the picker knives 21 and the pusher arm 25 through their respective apertures 4 and 8 to locate their striking surfaces adjacent the top surface of the base plate 1.

Figure 2:
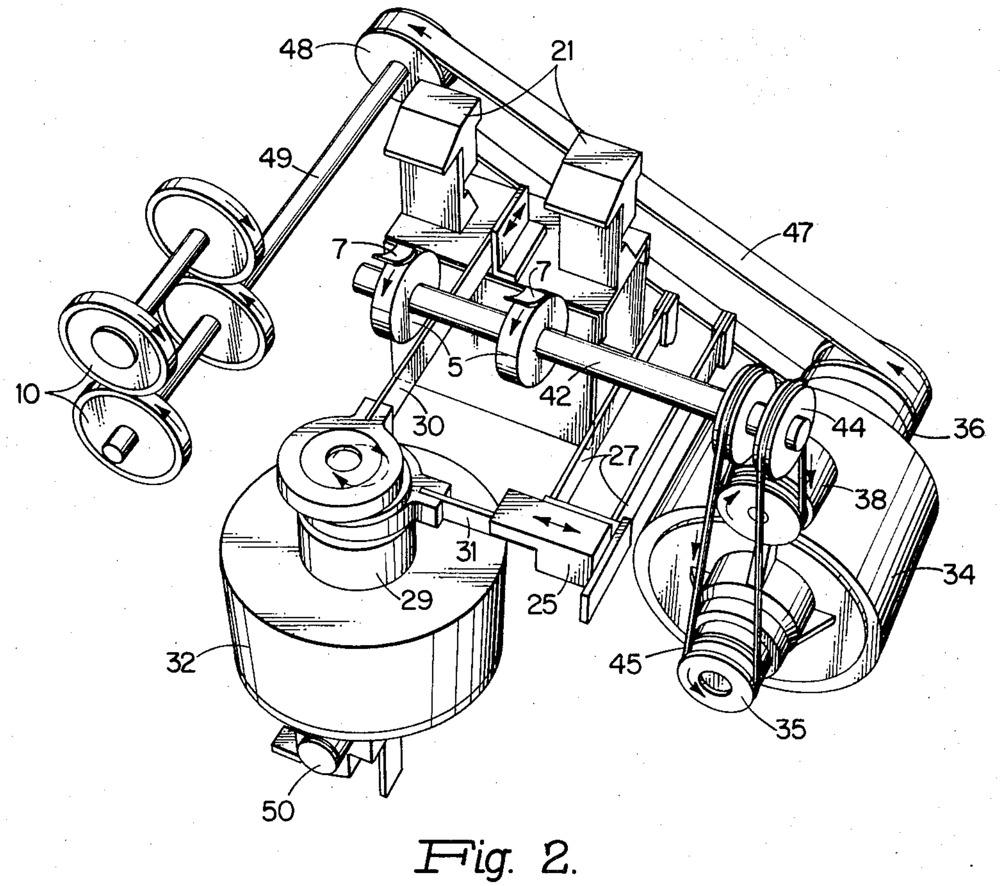
FIG. 2 is a perspective view of the card reader drive assembly which provides for the interaction of the transport elements.

In FIG. 2, the interrelationship of the dynamic transport elements is shown. Shaft 42 extends from the drive rolls 5 to a point above the idler 38 and the aperture 37 of base plate 20. An idler pulley 44 is located at the end of the shaft 42. A belt 45 is looped around the drive pulley 35 of the motor 34 and the idler 38 to engage idler pulley 44; and a belt 47 serves to interconnect the drive pulley 36 with the pulley 48. Pulley 48 is connected to the bottom rolls of pinch rolls 10 by means of shaft 49. With the rotation of the shaft of motor 34 in the counter-clockwise direction, the resulting motion of belt 45 rotates the top surface of drive rolls 5 toward wait station 2 and the motion of belt 47 rotates pinch rolls 10 toward one another and away from wait station 2.

When the hopper 3 is loaded with a vertical stack of computer cards, the bottom card therein rests adjacent the striking edges of the picker knives 21. With each revolution of the shaft of motor 32, the picker knives 21 are activated to strike the edge of the bottom card within hopper 3 to impel the card against the contact surfaces of leaf spring 7 and drive rolls 5. The card is carried by rolls 5 through to the wait station 2. The pusher arm 25, sequentially activated through eccentric coupling 29, strikes the card lying in wait station 2 forward against the contact edges of the pair of pinch rolls 10. The card is carried by rolls 10 away from the wait station 2 and over read head 15, where it is read photoelectrically. With each revolution of the shaft of motor 32, a next card is processed from hopper 3 through to the read head 15.

Motor 32 is cycled by a single revolution clutch 50 such that each motor revolution begins and ends with a card lying in the wait station 2. By such an arrangement, the wait station 2 may be used between revolutions of motor 32 for visible identification and checking of a card lying therein. Furthermore, aperture 14 allows for the ease of the removal of a card from station 2 before it is read photoelectrically.

Read head 15 is of the conventional type employing a light source and photocells for the detection of light through the holes in the punched computer cards. If data is recorded otherwise, such as magnetically, on the cards, the relevant read head may be easily employed adjacent pinch rolls 10 for the reading of the recorded information.

Housings 52 are attached to the upper side of base plate 1 of card carrying module A and extend over the apertures 4 to serve as protection against damage to the picker knives 21. Bar 9 is also attached to the base plate 1 and extends over the aperture 8 along the adjacent edge of wait station 2 in order to protect against damage to the pusher arm 25 and also to serve as a guide for a card being carried into the wait station 2.

Obviously, many modifications of the present invention are possible in the light of the above teaching. It is therefore to be understood that, in the scope of the appended claims, the invention may be practiced otherwise than as specifically described.

What is claimed is:

1. A card reader for transporting a punch card comprising:

A. a card transport module including:

1. a first base plate including a plurality of apertures positioned in spaced relationship with respect to one another so as to provide for integration with a pick push module,
2. card input means attached to said first base plate and being capable of holding at least one card,
3. a fixed, rectangular wait station having a surface for supporting said card fed from said card input means, said wait station located on said first base plate for providing visual identification and checking of said card, said wait station surrounded by said plurality of apertures,
4. drive rolls attached to the underside of said base plate and extending through a first aperture of said plurality of apertures on said first base plate, said first aperture positioned between said card input means and said wait station, 5. a leaf spring connected to said card input means and cooperating with said drive rolls for propelling said card onto said wait station, said leaf spring applying a normal force to said card so as to direct said card into contact with said drive rollers,
6. said plurality of apertures surrounding said wait station including:
7. a second aperture positioned adjacent a first side of said wait station,
8. a third aperture positioned adjacent a second side of said wait station, said third aperture providing ease of removal of said card from said wait station,
9. a fourth aperture positioned adjacent a third side of said wait station, said fourth aperture opposite said second aperture,
10. a fifth aperture positioned between a fourth side of said wait station and said card input means, B. said pick push module including:

1. a second base plate,
2. picker knives mounted on said second base by means of first flexures, said picker knives cooperatively mating with said fifth aperture to provide motion in a first direction to said card,
3. a pusher arm mounted on said second base plate by means of second flexures, said pusher arm disposed adjacent said wait station and cooperatively mating with said first plate via said second aperture, said arm aligned with said card located on said wait station for contacting said arm with said card and providing motion in a second direction to said card, 4. motor means having eccentric couplings attached thereto, said motor means attached to said second base plate and providing for sequential movement of said picker knives and said pusher arm,
5. a plurality of flexure rods attached to said eccentric coupling,
6. one of said flexure rods connected to said picker knives and providing motion in said first direction,
7. another of said flexure rods connected to said pusher arm and providing motion in a second direction;

C. a plurality of vertically extending posts connecting said card transport module with said pick push module, said posts vertically and spatially positioning said drive rolls with respect to said first base plate and said first aperture, said picker knives with respect to said first base plate and said second aperture and said pusher arm with respect to said first base plate and said third aperture; and D. a pair of pinch rolls mating with said fourth aperture, said pinch rolls having their contact loci within the same plane as said first base plate, whereby said card transport module and said card drive module are separable from each other for serviceability purposes.

2. The apparatus as defined in claim 1 and further including;

a read head disposed adjacent to said pinch rolls, said read head having photocells for the detection of light.

* * * * *